R. A. WATKINS.
ECCENTRIC DRIVING MECHANISM.
APPLICATION FILED OCT 14, 1920.

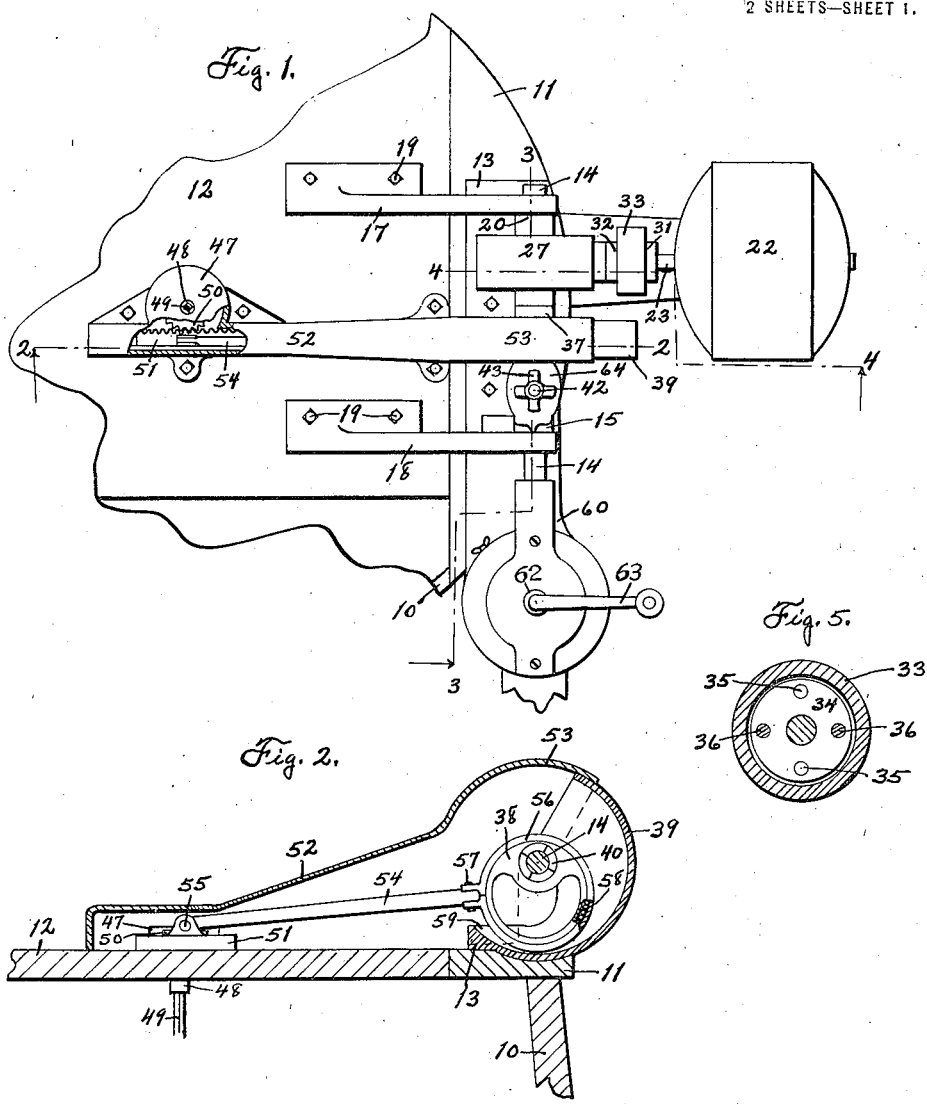

1,413,815.

Patented Apr. 25, 1922.

2 SHEETS—SHEET 2.

INVENTOR.
Roy A. Watkins

BY Earl M. Sinclair

ATTORNEY.

UNITED STATES PATENT OFFICE.

ROY A. WATKINS, OF CLARINDA, IOWA, ASSIGNOR TO CLARINDA LAWN MOWER COMPANY, OF CLARINDA, IOWA, A CORPORATION OF IOWA.

ECCENTRIC DRIVING MECHANISM.

1,413,815.  Specification of Letters Patent.  Patented Apr. 25, 1922.

Application filed October 14, 1920. Serial No. 416,970.

*To all whom it may concern:*

Be it known that I, ROY A. WATKINS, a citizen of the United States of America, and resident of Clarinda, Page County, Iowa, have invented a new and useful Eccentric Driving Mechanism, of which the following is a specification.

The object of this invention is to provide an improved driving mechanism especially designed for use on power washing machines.

A further object of this invention is to provide improved means for transforming continuous rotary into oscillatory rotary motion.

A further object of this invention is to provide means for transmitting power from a continuously rotating horizontal driving shaft to a vertical follower to be alternately rotated in opposite directions, through the use of an eccentric, pitman, rack and pinion.

A further object of this invention is to provide a driving mechanism for power washing machines which shall combine simplicity of construction with ease and quietness in operation, and is adapted for ready and quick application to a washing machine.

With these and other objects in view, my invention consists in the construction, arrangement and combination of elements hereinafter set forth, pointed out in my claims and illustrated by the accompanying drawing, in which—

Figure 3:
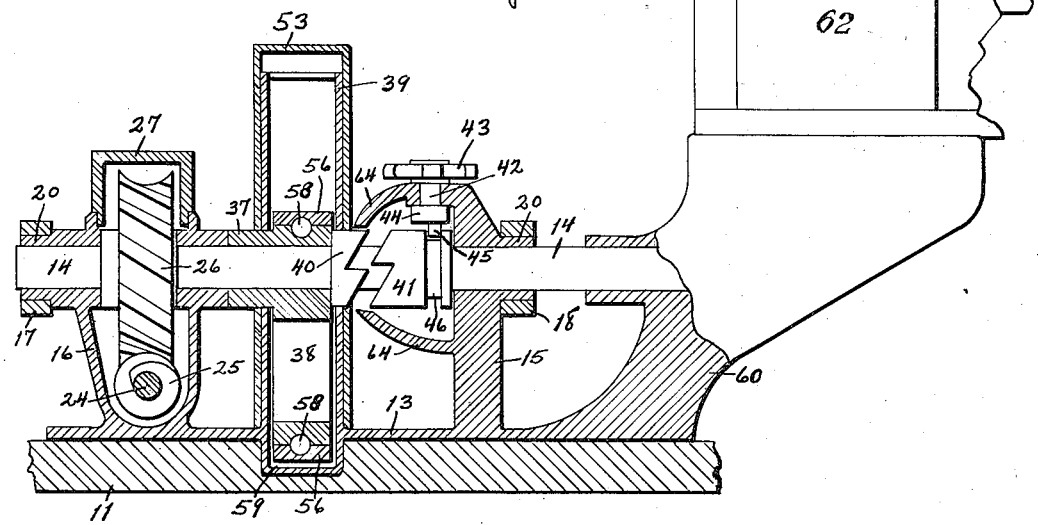
Figure 4:
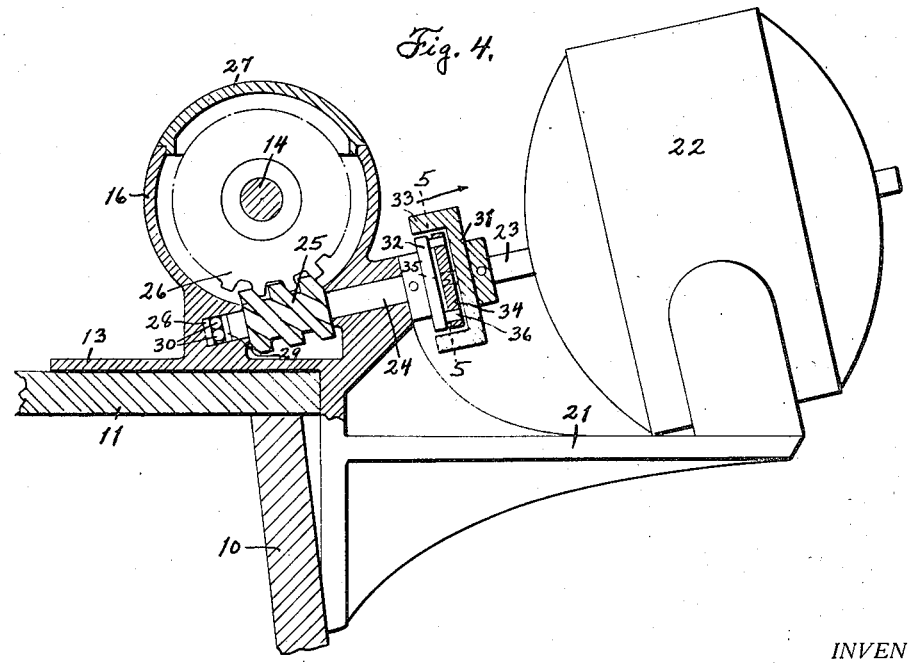

Figure 1 is a plan, partly in section, illustrating a portion of a washing machine equipped with my improved driving mechanism. Figure 2 is a vertical section on the indicated line 2—2 of Figure 1. Figure 3 is a vertical section on the line 3—3 of Figure 1. Figure 4 is a cross-section on the line 4—4 of Figure 1. Figure 5 is a cross-section on the line 5—5 of Figure 4.

In the construction of the mechanism as shown the numeral 10 designates a suitable support such as a washing machine tub, having a fixed cover member 11 and a movable cover member 12 adapted to overlie the major portion of the top of the tub. A supporting plate 13 is mounted on and suitably fixed to the fixed cover member 11. A driving shaft 14 is arranged in a horizontal plane above the plate 13 and is journaled in bearings carried by or a part of a bracket 15 and a gear housing 16 formed integrally on and and rising from said plate. Hinge members 17, 18 are secured to the top of the movable cover member 12, as by bolts 19, extend upwardly and outwardly beyond the margin of said cover member, and have bearings at their opposite ends on journals 20 projecting laterally from the bracket 15 and housing 16. Thus a pivotal connection is provided between the cover member and the support, the axis of articulation being laterally and vertically spaced from the joining line between the cover members 11, 12. This axis is coincident with that of the shaft 14, but the journals 20 prevent undesirable friction between the shaft and hinges.

A motor bracket 21 is mounted on the side of the tub 10 adjacent to the fixed cover member 11, and preferably is cast integrally with the base plate 13. A prime mover, such as an electric motor 22, is provided and is adapted to rest loosely on the bracket 21 and to supply power for driving the shaft 14. The motor shaft 23 has formed thereon or is suitably connected to a worm shaft 24 in axial alinement, to which is secured a worm or spiral gear 25 located in the lower part of the housing 16 and meshing with a worm gear 26 in said housing fixed to the driving shaft 14. The housing 16 is provided with a cover 27 for convenience in assembling, repairing and lubricating the parts. The worm shaft 24 is journaled in the housing 16 in a slightly inclined position and preferably is provided at its end with a thrust bearing consisting of spaced hardened or chilled disks 28, 29 between which a number of bearing balls 30 are mounted.

The motor shaft 23 preferably is not connected directly and rigidly to the worm shaft 24 but flexible coupling means is provided to lessen the strain on the motor. A disk 31 is fixed to the end of the motor shaft and a similar disk 32 to the adjacent end of the worm shaft, the disk 31 preferably being formed with a peripheral flange 33 partially enclosing the disk 32, and a washer 34, which may be of leather or similar material, mounted between said disks. The disk 31 is provided with diametrically arranged pins 35 projecting through holes in the washer 34, and the disk 32 is provided with diametrically arranged pins 36, staggered relative to the pins 35, and also projecting through said washer. Thus motion is transmitted from the shaft 23 to the shaft 24 but some yielding is permitted under excessive strain, because of the partially flexible nature of the washer 34.

A sleeve 37 is loosely mounted on the driving shaft 14 between the bearings thereof and to said sleeve is secured eccentrically a disk 38. A housing 39 is formed integrally on the base plate 13 and encloses the lower and outer portion of the eccentric disk, and the outer side of said housing is formed on an arc concentric with the shaft 14. One end portion of the sleeve 37 is formed as a clutch member 40, and a coacting clutch member 41 is feathered to the shaft 14 and adapted to engage the clutch member 40 at times to effect rotary movement of the sleeve and its eccentric. A shifter stem 42 is vertically journaled in the bracket 15 above the shaft 14 and has at its upper end a hand wheel 43 or other suitable means for turning it manually. On the lower end of the shifter stem 42 is a disk 44 having a downwardly projecting off-center pin 45 entering a peripheral groove 46 in the sliding clutch member 41. The offcenter pin 45 engaging in the groove 46 is designed to effect sliding movement of the clutch member 41 into or out of engagement with the clutch member 40 upon suitable rotary movement of the stem 42.

Secured to the central portion of the top of the movable cover member 12 is a substantially circular housing 47, and a dolly post 48 is arranged for rotary oscillation in said housing and passes through the said cover member. A dolly shaft 49 is formed angular in cross-section and is mounted through the post 48 and adapted for sliding movement relative to and for rotary oscillation with said post. The dolly shaft carries at its lower end a suitable dolly or other agitator, not shown. A pinion 50 is fixed to the dolly post 48 within the housing 47 and projects from one side of said housing. A rack 51 is slidably mounted adjacent the housing 47 and meshes with the pinion 50. The rack may be confined in a long narrow housing 52 fixed to the cover member 12 and communicating at one point with the housing 47. In this instance, the housings 47 and 52 are formed integrally and communicate for a short distance to permit intermeshing of the rack and pinion. The housing 52 is in alinement with and extends to the housing 39, and at its outer end is formed with an arcuate portion 53 partially embracing and adapted for movement through an arc about the arcuate outer portion of said housing 39, during movement of the cover member 12 on its hinges. A pitman 54 is pivotally connected, by a pin 55, to the rack 51 and traverses the housing 52 and is pivotally connected at its opposite end to an eccentric strap 56, by means of a pin 57, or other suitable means. The eccentric strap 56 embraces the eccentric disk 38 and said members preferably are grooved on their contacting faces to form a raceway for a series of bearing balls 58. The eccentric disk moves the strap 56 through an orbit, causing reciprocation of the pitman 54 and rack 51 and rotary oscillation of the pinion 50, dolly post and dolly devices. This operation is very quiet and easy as there are few moving parts and little friction.

The eccentric devices dip into lubricating oil contained in a trough 59 formed in the bottom of the housing 39, and the housing 16 also may be provided with lubricant for the gears 25, 26.

This provides a simple and inexpensive driving mechanism in which there are comparatively few parts to get out of order or require attention from the operator.

The shaft 14 also may be employed to drive a wringer mechanism carried by a bracket 60 formed at one end of the plate 13 and including a gear box 62 and controlling lever 63, as set forth in my companion application filed October 14, 1920, Serial Number 416,971.

The bracket 15 preferably is formed with a web 64 or housing partially enclosing the clutch members 40, 41 and the shifting disk and pin.

I claim as my invention—

1. In a driving mechanism for washing machines having fixed and movable cover members, a driving shaft journaled on the fixed cover member, a housing on said fixed cover member partially enclosing said driving shaft and having its outer wall concentric therewith, hinge connections between said movable and fixed cover members coaxial with said shaft, a dolly device mounted for rotary oscillation on said movable cover member, operative connections between said driving shaft and dolly shaft, and a housing enclosing said dolly shaft and operative connections and having an end portion concentric with and adapted to articulate about the arcuate portion of the first housing when the movable cover member is turned through an arc.

2. In a washing machine having a fixed and a movable cover member hingedly connected, a housing secured to said fixed cover member and having an outer wall formed on an arc, a housing secured to said movable cover member and having an end portion concentric with and adapted to articulate about the arcuate portion of the first housing when the movable cover member is turned through an arc, and driving connections within said housings.

3. A driving mechanism for power washing machines formed with fixed and movable cover members, comprising a driving shaft journaled on said fixed cover member, a sleeve loosely mounted on said shaft and formed with an eccentric, a housing mounted on said fixed cover member partially enclosing said sleeve and eccentric, the outer portion of said housing being formed on an arc concentric with said shaft, hinge connections between said movable and fixed cover members coaxial with said shaft, a dolly device mounted for rotary oscillation on said movable cover member, a pinion secured to said dolly device, operative connections between said eccentric and pinion, a housing enclosing said pinion and operative connections and having an end portion concentric with and adapted to articulate about the arcuate portion of the first housing when the movable cover member is turned through an arc, and means for clutching said sleeve to said shaft.

Signed at Clarinda, in the county of Page and State of Iowa, this 26th day of September, 1920.

ROY A. WATKINS.